H. W. WOODRUFF.
Car Wheel.
No. 8,644.
2 Sheets—Sheet 1.
Patented Jan. 6, 1852.
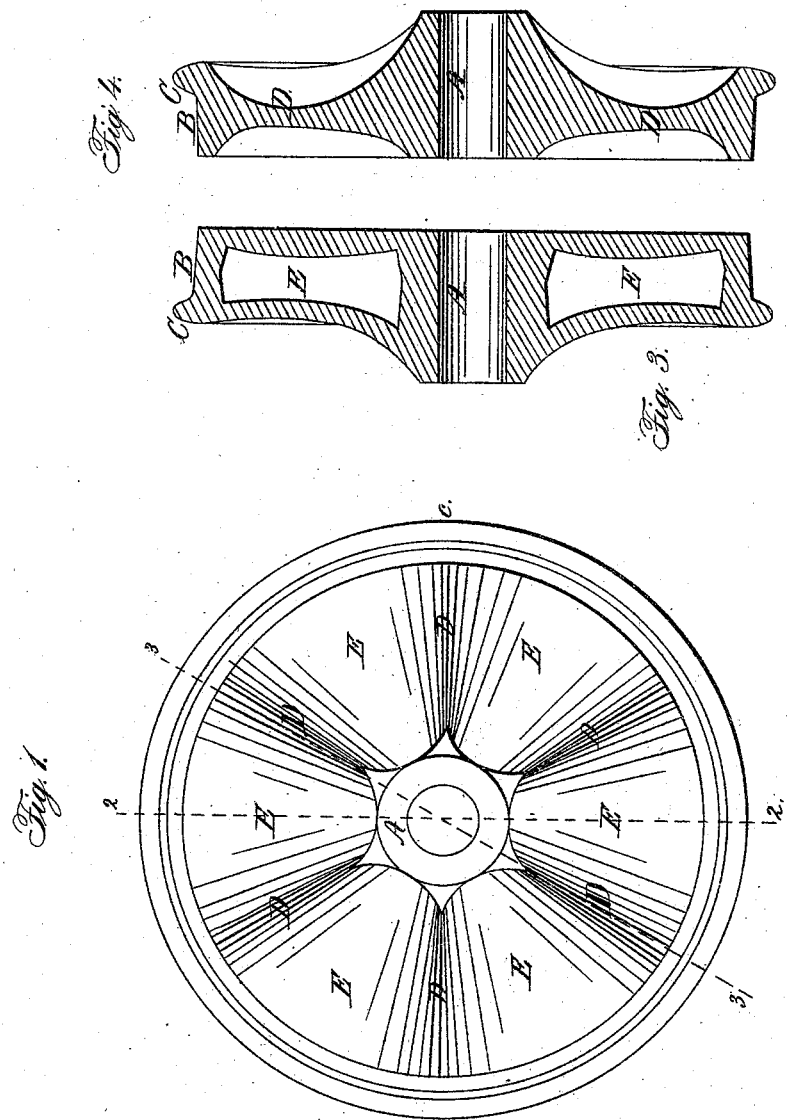

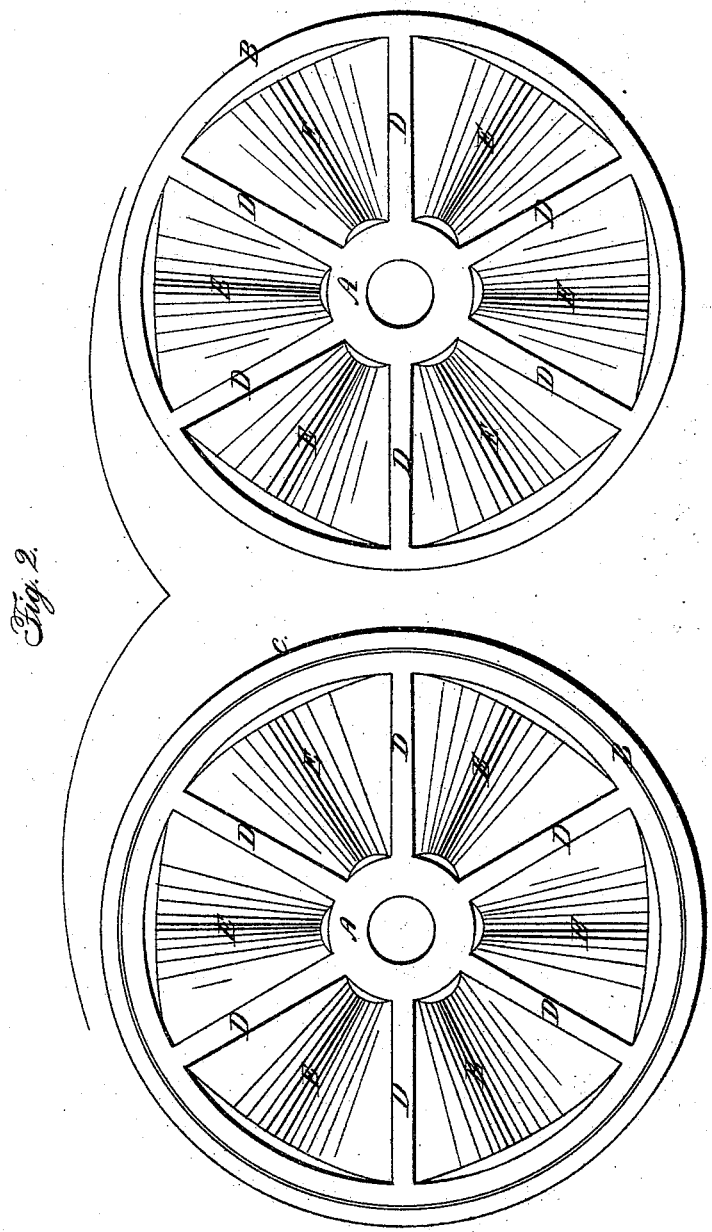

UNITED STATES PATENT OFFICE.

H. W. WOODRUFF, OF WATERTOWN, NEW YORK.

CAST-IRON CAR-WHEEL.

Specification of Letters Patent No. 8,644, dated January 6, 1852.

*To all whom it may concern:*

Be it known that I, HORACE W. WOODRUFF, of Watertown, Jefferson county, New York, have invented a new and useful Improvement in Cast-Iron Railroad Car-Wheels, and that the following is a full, clear, and exact description thereof, reference being had to the accompanying drawings, making part of this specification in which—

Figure 1, is a face view of my improved wheel; Fig. 2, two sections taken in a central plane parallel with Fig. 1, and representing the inside; Fig. 3, a section taken at the line 2 2 of Fig. 1, and passing through the hollow plate; and Fig. 4, a like section taken at the line 3 3 of Fig. 1, and passing through the solid plate.

The same letters indicate like parts in all the figures.

The object of my invention is to produce a cast iron wheel cast in one piece with a chilled rim and undivided hub. In casting wheels with the rim in a metal mold, to produce the effect technically called "chilling" and the interior of the wheel in a sand mold, the iron forming the rim coming in contact with the metallic part of the mold, cools, sets and contracts much more rapidly than the parts molded in sand, hence the parts of the wheel within the rim take the set or solid state, after the rim has in a great measure contracted, and therefore the inner parts will thereafter contract proportionally more than the rim, so that if the parts that connect the rim with the hub, be in straight radial lines, the metal in contracting will have a tendency to break or separate at some point or points in the diameter. To prevent this in casting spoke wheels, the hub is molded in three or more parts, each section being connected with a given number of spokes, so that in contracting, the sections of the hub simply separate from each other leaving open spaces between the sections which are afterwards filled up with wedges, and the whole bound together by hoops. Wheels thus made are objected to for three reasons, viz: the rim has no support between the spokes, and is therefore liable to be broken by concussions. The hub being made in sections wedged up and bound by hoops, is not so strong as if it were cast solid, and the heat is conducted from the spokes to the rim at their junction, and hence the chilling is less perfect at those points than midway between the spokes and therefore less hard in consequence of which the tread of the wheel wears unequally. If the wheel was cast with a single disk plate extending from hub to rim, it would be made sufficiently thick to prevent breaking by contraction without a divided hub; but then to do this and retain the required strength, would require too much weight of metal for practical use. To avoid the defects of the spoke wheel the chilled rim has been connected with an undivided hub, by means of two plates bent in various curves to yield to the unequal contraction by bending; but this although superior to the spoke wheel, because it avoids the unequal chilling of the rim, and the necessity of dividing the hub, still presents the disadvantages of not giving adequate support to the tread of the wheel between the two plates, and it is alleged to be deficient in strength in the direction of the radii. To avoid these difficulties the wheel has been cast with a single plate, presenting a series of waves in the direction of the circumference, and straight in the direction of the radius. And to prevent such plate from breaking at some point along the radius in yielding to the unequal contraction, they are subjected to an annealing process, that is, when yet in a highly heated state they are put in an oven to cool slowly and thus permit the particles of iron to yield gradually and adapt themselves to the contraction without breaking. The annealing process however has the effect of softening the chill on the rim, so that wheels thus made are not so durable on the tread and besides this the process is attended with much labor and expense.

The object of my invention is to produce a wheel for rail road cars, cast in one piece with a chilled rim and solid undivided hub, and with radial supports connecting together the hub and rim. And to this end the nature of my invention consists in casting the wheel in one piece with a chilled rim connected with a solid undivided hub by means of a plate which at certain parts is single and solid in the direction of the radii and acting in the manner of radial spokes, and between these parts double and spreading apart to act as hollow spokes, presenting curved or bent lines, in concentric lines on both faces, and curved or bent lines on one or both faces from hub to rim, and the whole constituting one casting.

In the accompanying drawings A, represents the hub with a central hole to receive the axle, and B, the rim, with a flanch C, as usual.

The wheel is so molded that its two faces are corrugated as represented in the drawings. The parts D, are solid, so that imaginary radial lines from the hub to the rim as at D, D, D, D, D, D, will pass through the solid metal. At these parts the external surface is curved on both faces of the wheel, extending from the ends of the hub to the edges of the rim or nearly so, as at D, D, Fig. 4. The hub on the flanch side of the wheel extends outside of the plane of that face of the rim and on the other face it coincides or nearly so with the plane of the rim. The spaces between the solid parts or spokes D, are hollow as represented by the letters E, in Figs. 2, and 3, and cast on cores properly inserted in the mold, thus forming two plates in the spaces between any two of the solid spokes, and connecting them together, the two plates gradually spreading out from each other, from each solid spoke and being at the greatest distance apart midway between the solid spokes. These plates are therefore bent or waved in lines concentric with the hub and rim. And the plates on the inner or flanch side are bent from hub to rim so that they are longer than a straight line from hub to rim. And on the outer face of the wheel the plates are partly bent and partly straight, that is to say, at the convex or most protuberant part they are represented as being in a straight line from hub to rim but may be curved, and as they recede each way toward the solid spokes they become bent. In this way it will be seen that the rim and hub are connected together by a plate which at certain parts is single and solid in the direction of the radii, and forming what may be termed radial spokes, and at other and at intermediate parts double and constituting hollow spokes, this compound or single and double plate giving support to the entire periphery of the rim and acting as a brace to the ends of the hub and edges of the rim to resist lateral strains. And the solid parts of the plate constituting the solid spokes give the required support in the direction of the radius, this support being aided by the double parts of the plate or plates, which being bent from hub to rim and in concentric lines can yield to the unequal contraction, and thus enable the solid parts to resist, without breaking, the strain due to the unequal contraction.

It has been stated above that the most protuberant parts of the hollow spokes or the hollow parts of the plate on the outside face of the wheel may be straight or bent. In either case they will yield to the unequal contraction for the following reason—viz; the hub on the outer or flanched side of the wheel projects beyond the plane of that face of the rim, and the plate extends in a bent line from the hub to the rim. Now then as the rim of the wheel is cast in a metal mold and the rest in sand as usual, the rim will contract while the inside is yet so hot and soft as to yield by bending as this contraction takes place, from the peculiar form of the plate on both faces, the effect of which will be to force up the hub, and as the hub rises it carries with it the lower or straight part of the plate which thus assumes the form of a flat cone, which is longer than a straight line, so that as the parts of the wheel within the rim contract in cooling, the whole will settle down to the original form molded, thus making provision for the unequal contraction, which takes place first in the rim and then inside. In molding the wheel, care must be taken to insert the cores and sustain them in the proper position. The connections of the cores with the bottom of the mold forms holes in the plate, through which the cores can be broken and removed.

I do not wish to limit myself to any special form in the curvatures or undulations of the single and double plate, so long as the single solid parts of the said plate form radial connections between the hub and rim, and the double or hollow parts are so formed as to make provision by bending for the unequal contraction, to sustain and ease off the contracting strain from the radial parts and thus prevent them from breaking in cooling.

What I claim as my invention and desire to secure by Letters Patent is—

Casting a rail road car wheel with a chilled rim and solid undivided hub, connected by means of a plate which is single and solid at certain parts, so that imaginary radial lines from hub to rim, will pass through the said solid parts, and double and bent in opposite directions, between the single and solid parts, and wholly or partly from hub to rim, substantially as specified, the whole constituting one casting, substantially as and for the purpose specified.

In testimony whereof I have hereunto signed my name before two witnesses.

H. W. WOODRUFF.

Witnesses:
Wm. P. Elliott,
J. S. Smith.